US012613526B2

(12) United States Patent
Essoussi

(10) Patent No.: US 12,613,526 B2
(45) Date of Patent: Apr. 28, 2026

(54) METHOD AND AVIONICS COMPUTER FOR DETERMINING AN ANCHOR POINT OF A TERMINAL SEGMENT ON THE BASIS OF A MISSED APPROACH POINT, FOR A NON-PRECISION APPROACH

(71) Applicant: Airbus Operations SAS, Toulouse (FR)

(72) Inventor: Mohamed-Habib Essoussi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 199 days.

(21) Appl. No.: 18/501,192

(22) Filed: Nov. 3, 2023

(65) Prior Publication Data

US 2024/0168490 A1 May 23, 2024

(30) Foreign Application Priority Data

Nov. 17, 2022 (FR) ...................................... 2211936

(51) Int. Cl.
| | |
|---|---|
| *G05D 1/00* | (2024.01) |
| *G08G 5/21* | (2025.01) |
| *G08G 5/54* | (2025.01) |

(52) U.S. Cl.
CPC .............. *G05D 1/101* (2013.01); *G08G 5/21* (2025.01); *G08G 5/54* (2025.01)

(58) Field of Classification Search
CPC .. G08G 5/21; G08G 5/54; G08G 5/55; G08G 5/50; G08G 5/70; G05D 1/0676; G05D 1/101; B64D 45/04
See application file for complete search history.

(56) References Cited

U.S. PATENT DOCUMENTS

| | | | | |
|---|---|---|---|---|
| 9,704,406 B1 * | 7/2017 | Young | ...................... | G08G 5/55 |
| 10,922,985 B2 * | 2/2021 | De Villele | ............... | G08G 5/76 |

(Continued)

FOREIGN PATENT DOCUMENTS

| | | |
|---|---|---|
| CN | 104794213 A | 7/2015 |
| CN | 112880679 A | 6/2021 |
| CN | 112883541 A | 6/2021 |

OTHER PUBLICATIONS

French Search Report for corresponding French Patent Application No. 2211936 dated May 31, 2023; priority document.

*Primary Examiner* — Abby Lin
*Assistant Examiner* — Kayla R Doros
(74) *Attorney, Agent, or Firm* — Greer, Burns & Crain, Ltd.

(57) ABSTRACT

The avionics computer, in particular a flight management system, comprises a processing unit configured to compare a first altitude with what is referred to as a threshold altitude, the first altitude corresponding to the altitude of a missed approach point relative to the runway, the threshold altitude being equal to the sum of a second altitude corresponding to the altitude of the runway and of a threshold crossing height, and to determine a terminal point that has an altitude equal to the threshold altitude and that forms, with the position of the missed approach point, a straight line segment that has a slope equal to the slope of the straight line segment defined by the missed approach point and a final approach fix, said terminal point being capable of being used as anchor point, the avionics computer thus having improved properties especially in terms of availability and robustness.

8 Claims, 2 Drawing Sheets

(56)  References Cited

U.S. PATENT DOCUMENTS

| 2004/0183698 | A1 |   | 9/2004 | Rouquette et al. |  |
|---|---|---|---|---|---|
| 2014/0222257 | A1 | * | 8/2014 | Wyatt ................... | B64D 45/08 |
|  |  |  |  |  | 701/16 |
| 2015/0005992 | A1 | * | 1/2015 | Coulmeau ........... | G05D 1/0676 |
|  |  |  |  |  | 701/16 |
| 2017/0162067 | A1 | * | 6/2017 | Rouquette ............... | G08G 5/54 |
| 2023/0063241 | A1 | * | 3/2023 | Chippa ................... | G08G 5/54 |

* cited by examiner

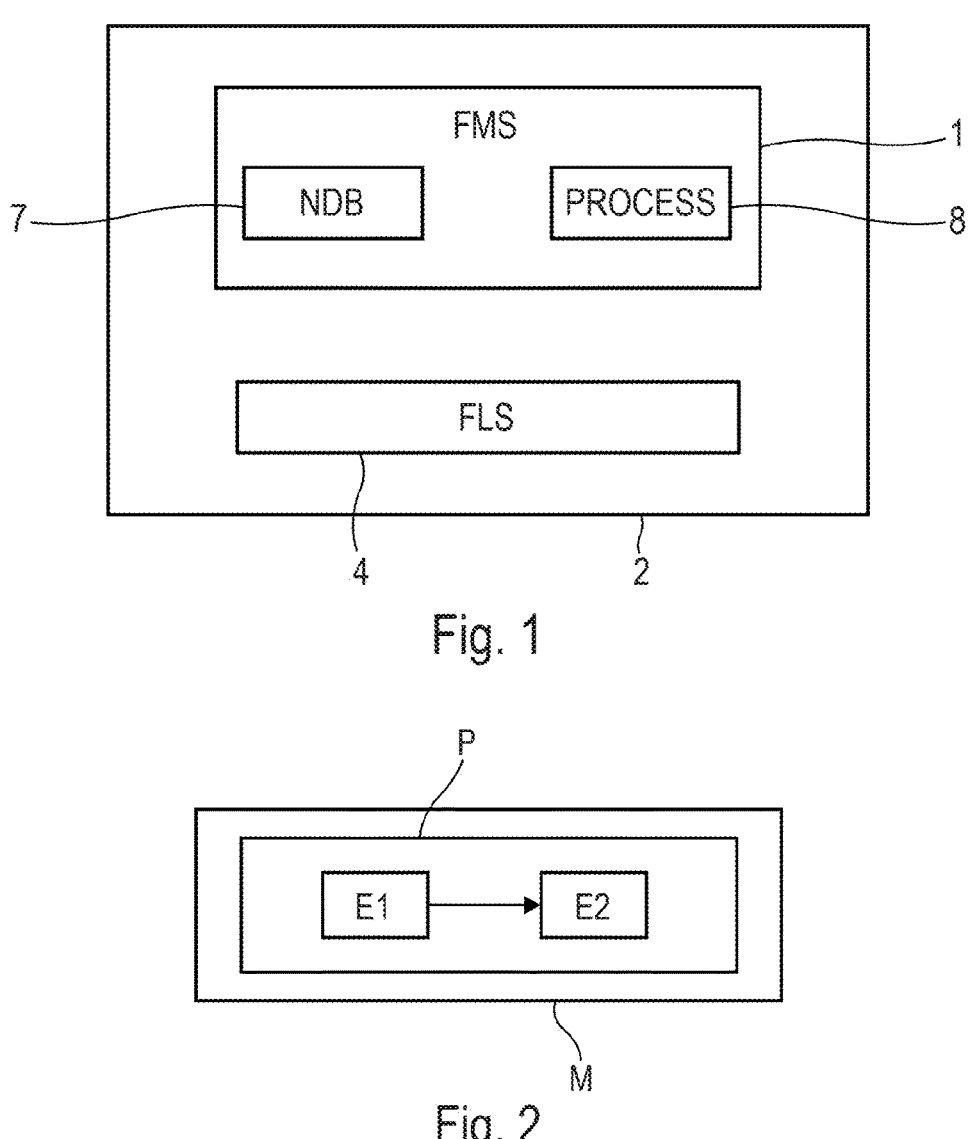
Fig. 1
Fig. 2
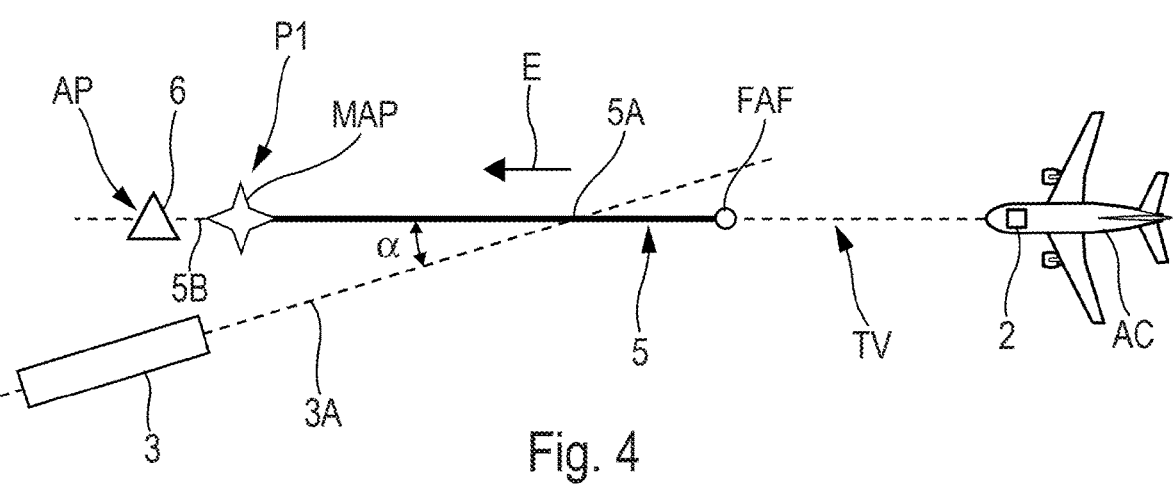
Fig. 4

METHOD AND AVIONICS COMPUTER FOR DETERMINING AN ANCHOR POINT OF A TERMINAL SEGMENT ON THE BASIS OF A MISSED APPROACH POINT, FOR A NON-PRECISION APPROACH

CROSS-REFERENCES TO RELATED APPLICATIONS

This application claims the benefit of the French patent application No. 2211936 filed on Nov. 17, 2022, the entire disclosures of which are incorporated herein by way of reference.

FIELD OF THE INVENTION

The present invention relates to a method and avionics computer intended to determine an anchor point of a terminal segment of a virtual path for a non-precision FLS (FLS standing for FMS Landing System and FMS standing for Flight Management System) approach mode of an aircraft, with a view to landing the aircraft on a runway of an aerodrome, and to a procedure and set of systems for implementing such a non-precision approach mode, comprising such a method and such a device, respectively.

BACKGROUND OF THE INVENTION

In the context of the present invention, by "non-precision approach" what is meant is an approach that is not a precision instrument approach such as, for example, an ILS approach (ILS standing for Instrument Landing System), which especially uses runway-edge ground stations and a dedicated radio receiver installed on board the aircraft.

An approach is a non-precision approach, such as considered in the present invention, when the above equipment is not available or in operation, at least in part, so that a conventional precision approach cannot be implemented. The present invention more particularly applies to a non-precision FLS approach.

To implement a non-precision FLS approach, it is necessary to determine a virtual path corresponding to the theoretical path that the aircraft must follow during this approach. Guidance of the aircraft then consists in attempting to cancel out any discrepancies between the actual position of the aircraft and the position it would have if it were on this virtual path. Conventionally, the virtual path comprises a terminal segment, namely the last segment before reaching the runway. This terminal segment is defined with respect to a downstream end point called the anchor point.

This anchor point is, conventionally, determined and positioned at the threshold of the runway, which is generally contained in a navigation database.

However, in certain situations, especially depending on the orientation of the virtual path with respect to the axis of the runway, for example when the virtual path crosses the axis of the runway downstream of the threshold of the runway, or indeed when a missed approach point is located beyond the threshold of the runway, it is not possible to determine the anchor point and therefore it is not possible to implement a non-precision FLS approach mode.

In addition, the threshold of the runway may sometimes be temporarily shifted, especially when work is being done on the runway. It is then possible for the position of the new runway threshold not to be updated in the navigation database, so that an erroneous runway threshold is provided in such a situation.

This conventional system for implementing a non-precision FLS approach mode could therefore be further improved, especially in terms of availability and robustness.

SUMMARY OF THE INVENTION

One objective of the present invention is to improve the implementation of a non-precision FLS approach mode of an aircraft. To this end, it relates to a method for determining an anchor point of a terminal segment of a virtual path for a non-precision FLS approach mode (or FLS approach) of an aircraft, with a view to landing the aircraft on a runway of an aerodrome, the terminal segment starting at a final approach fix and ending at the anchor point, the method being implemented in an avionics computer, in particular a flight management system (or computer), comprising at least a processing unit and a navigation database.

According to the invention, the method comprises at least the following steps:

- a comparing step, implemented by the processing unit of the avionics computer, comprising comparing a first altitude with what is referred to as a threshold altitude, the first altitude corresponding to the altitude of a missed approach point relative to the runway contained in the navigation database of the avionics computer, the threshold altitude being equal to the sum of a second altitude corresponding to the altitude of the runway and of a threshold crossing height; and
- a computing step, also implemented by the processing unit of the avionics computer, comprising determining, depending on this comparison, a terminal point that has an altitude equal to the threshold altitude and that forms, with the position of the missed approach point, a straight line segment that has a slope equal to the slope of the straight line segment defined by the missed approach point and the final approach fix, the terminal point (thus determined) being capable of being used as anchor point.

Thus, to determine the anchor point, the method does not use the threshold of the runway, as is currently the case, but rather the missed approach point or MAP or MAP point, which corresponds to the boundary point at which the pilot must at the latest initiate a go-around when the corresponding approach is missed. This MAP point, which is contained in the navigation database related to the aerodrome, is a parameter that is regularly updated. In addition, the anchor point is determined with respect to a height relative to the runway and no longer with respect to a runway threshold position (which could be modified, especially in case of temporary work). The method is thus advantageous in terms of robustness (and safety).

In addition, as specified below, the anchor point may be determined, by means of the method, irrespectively of the orientation of the terminal segment of the virtual path with respect to the runway axis, this making it possible to determine an anchor point in situations where this is not currently possible, and thus to increase FLS-mode availability.

Advantageously, if the comparing step concludes that the first altitude is greater than or equal to the threshold altitude (equal to the sum of the altitude of the runway and of the threshold crossing height), the computing step uses the terminal point as anchor point.

In addition, advantageously, if the comparing step concludes that the first altitude is less than the threshold altitude, the computing step uses as anchor point:

in case of presence of a prescribed final end point (FEP) in the navigation database, this prescribed final end point;

in case of absence of a prescribed final end point (FEP) from the navigation database, the terminal point (computed in the aforementioned manner).

Implementation of the method is not limited by the orientation of the projection on the ground of the terminal segment of the virtual path with respect to the axis of the runway, and it may thus be applied in the following situations:

the projection on the ground of the terminal segment (of the virtual path) is aligned with the axis of the runway or is parallel to this axis;

the projection on the ground of the terminal segment (of the virtual path) makes to the axis of the runway a non-zero angle $\alpha$ less than or equal to 90°.

The present invention also relates to a procedure for implementing a non-precision FLS approach mode of an aircraft, with a view to landing the aircraft on a runway of an aerodrome, the procedure using a virtual path comprising a terminal segment that is defined with respect to an anchor point, the procedure being implemented by a set of avionics systems.

According to the invention, the procedure comprises at least a method for determining an anchor point such as described above, and the procedure uses the anchor point determined by the method as anchor point of the terminal segment of the virtual path.

The present invention further relates to an avionics computer, in particular a flight management system (or computer), for determining an anchor point of a terminal segment of a virtual path for an FLS approach, the terminal segment starting at a final approach fix and ending at the anchor point, the avionics computer comprising at least a processing unit and a navigation database.

According to the invention, the processing unit is configured:

to compare a first altitude with what is referred to as a threshold altitude, the first altitude corresponding to the altitude of a missed approach point relative to the runway contained in the navigation database of the avionics computer, the threshold altitude being equal to the sum of a second altitude corresponding to the altitude of the runway and of a threshold crossing height; and to determine, depending on this comparison, a terminal point that has an altitude equal to the threshold altitude and that forms, with the position of the missed approach point, a straight line segment that has a slope equal to the slope of the straight line segment defined by the missed approach point and the final approach fix, the terminal point (thus determined) being capable of being used as anchor point.

The present invention also relates to a set of avionics systems for implementing an FLS approach, the set comprising at least a flight management system configured to use a virtual final path a terminal segment of which is defined with respect to an anchor point.

According to the invention, the set (of systems) comprises at least an avionics computer for determining an anchor point such as described above, and the set (of systems) is configured to be able to use the anchor point determined by the avionics computer as anchor point of the terminal segment of the virtual path.

Moreover, the present invention also relates to an aircraft, in particular a cargo aircraft, which comprises at least an avionics computer and/or at least a set of systems, such as those described above.

BRIEF DESCRIPTION OF THE DRAWINGS

The appended FIGURES will make it easy to understand how the invention may be implemented. In these FIGURES, identical references designate similar elements.

FIG. 1 is the block diagram of a particular embodiment of a set of systems for implementing an FLS approach comprising an avionics computer for determining an anchor point of a terminal segment of a virtual path.

FIG. 2 is the block diagram of a particular embodiment of a procedure for implementing an FLS approach comprising a method for determining an anchor point of a terminal segment of a virtual path.

FIG. 4 is a schematic view in a horizontal plane of the situation in FIG. 3 in the particular case of a non-zero angle between the terminal segment and the runway axis.

DETAILED DESCRIPTION OF THE PREFERRED EMBODIMENTS

The avionics computer 1, schematically shown in FIG. 1 and allowing the invention to be illustrated, is intended to determine an anchor point of a terminal segment of a virtual path, as specified below.

In one preferred embodiment, this avionics computer 1 corresponds to a flight management system (or computer) of an aircraft AC, of a cargo aircraft for example.

In addition, in one preferred application, this avionics computer 1 forms part of a set 2 of systems that is intended to implement a non-precision FLS approach mode (referred to as an "FLS approach" below) of the aircraft AC.

Figure 3:
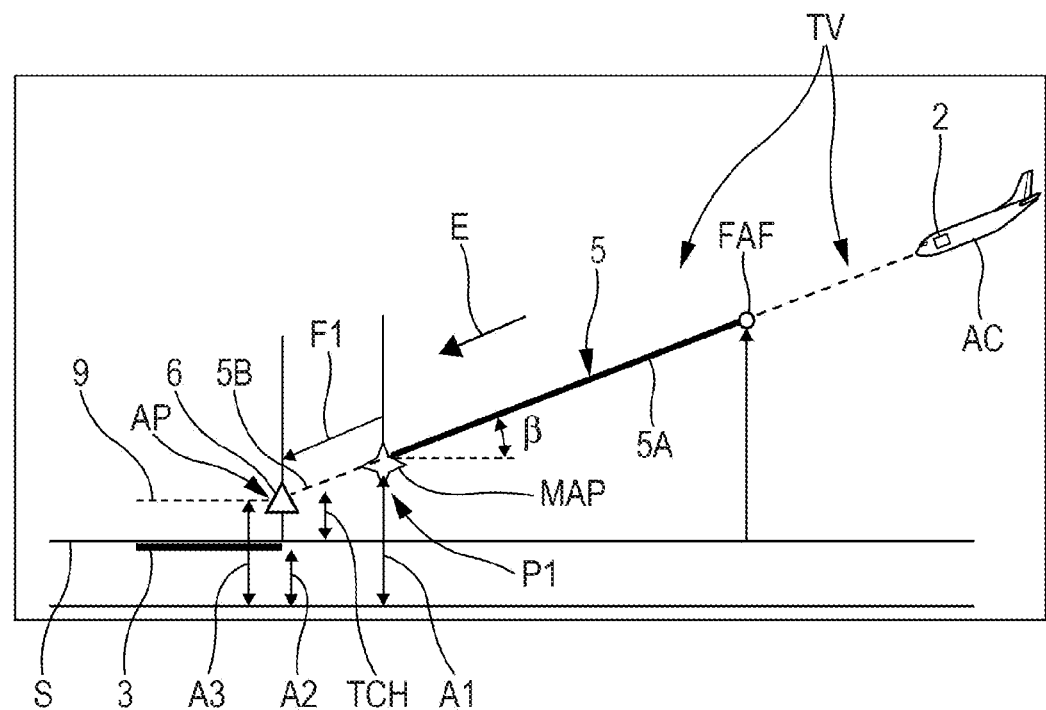
FIG. 3 is a schematic view in a vertical plane of a terminal segment of a virtual path followed by an aircraft during an approach, illustrating the way in which an anchor point is determined for a missed approach point located upstream of the runway.
Figure 5:
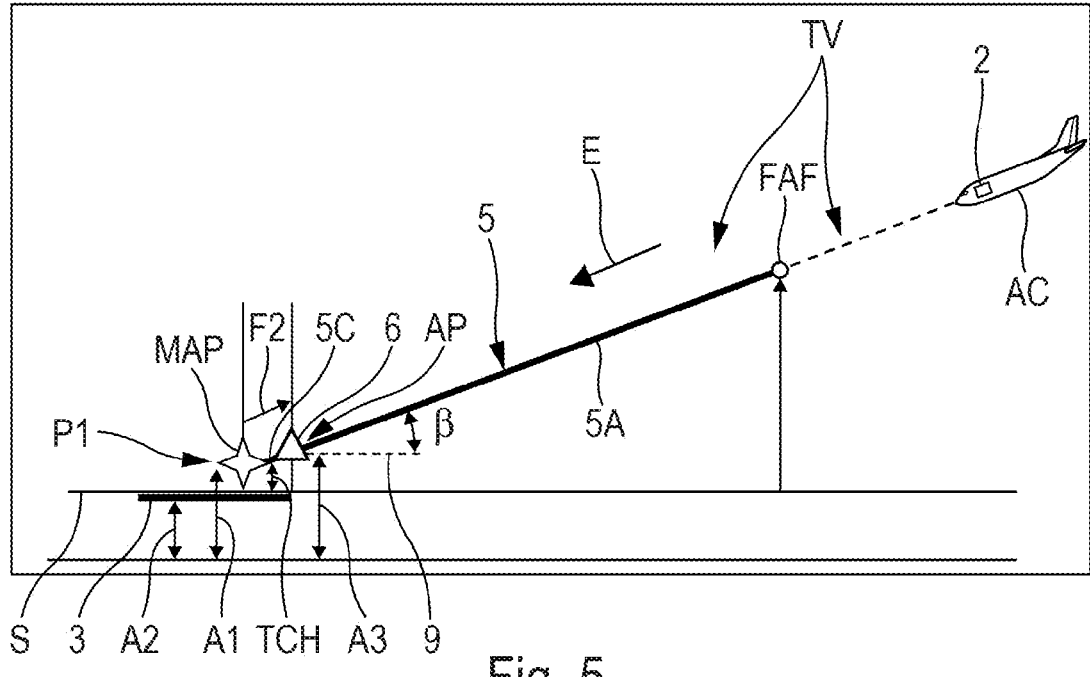
FIG. 5 is a schematic view in a vertical plane of a terminal segment of a virtual path followed by an aircraft during an approach, illustrating the way in which an anchor point is determined for a missed approach point located downstream of the runway.

In the examples of FIGS. 3 to 5, the aircraft AC equipped with the set 2 is in a phase of approaching a runway 3 of an aerodrome, with a view to landing on this runway 3.

The set 2 allows, as is conventionally the case, a virtual (final) path TV to be determined and the aircraft AC to be made to follow it to implement an FLS approach, with a view to the landing the aircraft AC on the runway 3. More precisely, the set 2 determines the lateral and vertical deviations of the current position of the aircraft AC with respect to this virtual path TV (or virtual approach axis), and the aircraft AC is then piloted so as to cancel out these deviations.

To do this, the set 2 comprises, in addition to the avionics computer 1, a group 4 of conventional systems. The group 4 generally comprises, as is conventionally the case, at least certain of the following systems:

an information-processing system, for example a multi-mode receiver (MMR);

a flight guidance system (FGS);

a flight warning system (FWS);

a terrain awareness and warning system (TAWS).

The conventional systems of the group 4 are not described further in the present description.

The set 2 (which is located on board the aircraft AC, as shown very schematically in FIGS. 3 to 5) is therefore intended to assist the pilot of the aircraft AC, especially with implementing the FLS approach along the virtual path TV.

This virtual path TV comprises a terminal segment 5 (or final approach segment). This terminal segment 5 corresponds to a straight line segment which, in the direction (illustrated by an arrow E) of flight of the aircraft AC during the approach, starts at a fix FAF (FAF standing for final approach fix), i.e., an upstream point or fix representing the place where final approach begins, and it has a slope β, generally of the order of 3°. In the following description, the terms "upstream" and "downstream" are defined with respect to the direction of flight of the aircraft AC indicated by the arrow E in FIGS. 3 to 5.

The terminal segment 5 ends at a downstream point representing an anchor point AP.

The purpose of the avionics computer 1 is to determine the anchor point AP of the terminal segment 5 and to deliver it to the set 2 so that it can use it to implement the FLS approach.

To do this, the avionics computer 1 comprises at least, as shown in FIG. 1:

a navigation database (NDB) 7; and a processing unit (PROCESS) 8 configured to receive data, especially from the navigation database 7, and to carry out processing operations based on these data.

More precisely, the processing unit 8 is configured:

to compare a first altitude A1 with what is referred to as a threshold altitude A3, this first altitude corresponding to the altitude A1 of a missed approach point MAP (or MAP point) that is relative to the runway 3 (FIGS. 3 and 5) and that is contained in the navigation database 7 of the avionics computer 8, the threshold altitude A3 being, for its part, equal to the sum of a second altitude A2 corresponding to the altitude of the runway 3 and of a threshold crossing height TCH; and to determine, depending on the result of this comparison, a terminal point 6 capable of being used as anchor point AP.

As specified below, the processing unit 8 is configured to compute the terminal point 6 (FIGS. 3 to 5) so that it corresponds to a point that has an altitude equal to the threshold altitude A3 and that forms, with the position PI of the missed approach point MAP, a straight line segment 5B, 5C that has a slope β that is equal to the slope of the straight line segment 5A defined by the missed approach point MAP and the fix FAF.

The threshold crossing height TCH is either contained in the navigation database 7 or stored in a memory of the avionics computer 1, and is generally equal to 50 feet (about 15 meters) in this case.

The avionics computer 1 therefore does not use the threshold of the runway, as is currently the case, but rather the MAP point, which is contained in the navigation database 7 related to the aerodrome and which is a parameter that is regularly updated, and determines the anchor point with respect to a TCH of the runway 3 and no longer with respect to a position of the threshold of the runway (which could be modified, especially in case of temporary work), this being advantageous in terms of robustness (and safety).

The avionics computer 1, such as described above, is intended to implement a method P (shown in FIG. 2) for determining an anchor point AP of a terminal segment 5 of a virtual path TV for an FLS approach of an aircraft AC, with a view to landing the aircraft AC on a runway 3 of an aerodrome, as illustrated in FIGS. 3 to 5, the terminal segment 5 starting at the final approach fix FAF and ending at the anchor point AP.

This method P forms part of a procedure M (FIG. 2) for implementing, by means of the set 2, an FLS approach, which uses the anchor point AP determined by the method P as the anchor point of the terminal segment 5 of the virtual path TV when implementing the FLS approach.

As shown in FIG. 2, the method P especially comprises a comparing step E1 and a computing step E2, which are detailed below.

The method P takes into account the position PI (namely the latitude, longitude, and altitude A1) of the missed approach point MAP, or MAP point, relative to the runway 3. The MAP point, which is published, corresponds to the limit point at which the pilot must at the latest initiate a go-around when the corresponding approach is missed (this especially being the case when the pilot is unable to see runway 3 before reaching this MAP point).

The method P also takes into account the altitude A2 corresponding to the altitude of the runway 3, i.e., the altitude of the ground S level with the runway 3, and the height TCH.

The comparing step E1, which is implemented by the processing unit 8, comprises:

computing the threshold altitude A3 by summing the altitude A2 (of the runway 3) and the threshold crossing height TCH; and comparing the altitude A1 with this threshold altitude A3 (thus computed).

The determined AP anchor point depends on the result of this comparison, as detailed below.

Moreover, the computing step E2, which is also implemented by the processing unit 8 after the comparing step E1, comprises determining, depending on this comparison, the anchor point AP and especially the terminal point 6.

More precisely, the computing step E2 comprises defining the terminal point 6 to be the point that has an altitude equal to the threshold altitude A3 and that forms, with the position PI of the MAP point, a straight line segment 5B that has a slope β equal to the slope of the straight line segment 5A defined by the point MAP and the fix FAF.

However, as indicated above, the determined (in the computing step E2) anchor point AP depends on the result of the comparison made in the comparing step E1.

Firstly, if the comparing step E1 concludes that the altitude A1 is greater than or equal to the threshold altitude A3, i.e., the sum of the altitude A2 and of the threshold crossing height TCH, the computing step E2 determines the terminal point 6 and uses it (delivers it) as anchor point AP.

In such a situation, as shown in FIG. 3, the computing unit 10 defines the terminal point 6 (and therefore the anchor point AP) to be the point of intersection between:

on the one hand, an upstream extension 5B (as illustrated by an arrow F1) of the portion 5A (of the terminal segment) defined between the points FAF and MAP, starting from the point MAP, and having a slope of value equal to the angle (of slope) β of the portion 5A; and on the other hand, a horizontal plane 9 of threshold altitude A3.

In this situation, the terminal segment 5 that will be used to implement the FLS approach and that is defined between the fix FAF and the terminal point 6 (representing the anchor point AP) corresponds to the portion 5A (which is a portion of a straight line segment) plus the extension 5B (which is also a straight line segment).

This situation applies to the following cases:

to a first case (not shown) where the projection on the ground of the terminal segment 5 is aligned with the axis 3A of the runway 3 or is parallel to this axis 3A of the runway 3; and to a second case where the projection on the ground of the terminal segment 5 makes to the axis 3A of the runway 3 a non-zero angle α (less than or equal to 90°), as shown in FIG. 4. This second case therefore also concerns situations where the angle α is large and, for example, greater than 50°.

The anchor point AP may therefore be determined, by means of the method P, irrespectively of the orientation of the terminal segment 5 of the virtual path TV with respect to the axis 3A of the runway 3, this making it possible to determine an anchor point AP in situations where this is not currently possible, and thus to increase FLS-mode availability.

Secondly, if the comparing step E1 concludes that the altitude A1 is less than the threshold altitude A3, i.e., the sum of the altitude A2 of the runway 3 and of the threshold crossing height TCH, the computing step E2 determines the anchor point AP, depending on whether or not a prescribed final end point (FEP) is present in the navigation database 7.

More precisely, the computing step E2 defines the anchor point AP to be:

in case of presence of a prescribed final end point in the navigation database 7, this prescribed FEP (not shown); and in case of absence of an FEP from the navigation database 7, the terminal point 6 determined by the processing unit 8.

In the latter situation, as shown in the figure, the processing unit 8 defines the terminal point 6 (and therefore the anchor point AP) to be the point of intersection between:

on the one hand, a downstream retraction 5C (as illustrated by an arrow F2) with respect to the portion 5A (of the terminal segment) defined between the points FAF and MAP, starting from the point MAP, and having a slope of value equal to the angle (of slope) β of the portion 5A; and on the other hand, a horizontal plane 9 of threshold altitude A3.

In the latter situation, the terminal segment 5 that will be used to implement the FLS approach (in the absence of FEP) and that is defined between the fix FAF and the terminal point 6 (representing the anchor point AP) corresponds to the portion 5A (which is a portion of a straight line segment) minus the retraction 5C (which is also a straight line segment).

The avionics computer 1 and the method P (and the set 2 and the procedure M that use the anchor point AP determined by the avionics computer 1 and the method P), such as described above, have many advantages. In particular, they have advantages:

in terms of robustness and safety, since they are not affected by a temporary change in the threshold of the runway, especially in the case of work;

in terms of availability, since they allow an anchor point to be determined (and thus an FLS approach to be implemented) for orientations of the terminal segment of the virtual path with respect to the axis of the runway that do not currently allow such, and, in particular, when the intersection between the projection on the ground of the terminal segment of the virtual path and the axis of the runway lies beyond the runway and when the angle between this projection and the axis of the runway exceeds 50°;

in terms of provision of information capable of being used, where appropriate, in a future automatic landing system for straight and non-staggered approaches.

More particularly, with respect to the conventional operating mode, in which the threshold of the runway (or an FEP) is used as anchor point, the anchor point AP (determined by the avionics computer 1) does not change in the following cases:

the MAP point is located on the threshold of the runway;

the MAP point is located beyond the threshold of the runway and an FEP is contained in the navigation database 7, this FEP corresponding in this case to the anchor point AP.

In contrast, with respect to the conventional operating mode, the anchor point AP (determined by the avionics computer 1) is modified when the MAP point is located upstream of the threshold of the runway, irrespectively of the orientation of the terminal segment with respect to the axis of the runway, both for a terminal segment aligned with or parallel to the axis of the runway, and for a terminal segment making to the axis of the runway a non-zero angle α less than or equal to 90°. This makes it possible to increase the robustness of the FLS mode (especially in the case of a temporary movement of the threshold of the runway).

Furthermore, an anchor point AP (allowing an FLS approach to be implemented) can be determined, by the avionics computer 1, in the following case where it would be impossible to do so in the conventional operating mode: the MAP point is located beyond (downstream of) the threshold of the runway and no FEP is contained in the navigation database 7, this allowing the availability of the FLS mode (and its robustness, in case of temporary movement of the threshold of the runway) to be increased.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining an anchor point of a terminal segment of a virtual path for a non-precision Flight Management System (FMS) Landing System (FLS) approach mode of an aircraft, with a view to landing the aircraft on a runway of an aerodrome, said terminal segment starting at a final approach fix and ending at said anchor point, said method being implemented in an avionics computer being a flight management system, comprising at least a processing unit and a navigation database, comprising at least the following steps:

comparing, implemented by the processing unit of the avionics computer, a first altitude with a threshold altitude, the first altitude corresponding to an altitude of a missed approach point relative to the runway contained in the navigation database of the avionics computer, the threshold altitude being equal to a sum of a second altitude corresponding to an altitude of the runway and of a threshold crossing height;

computing, also implemented by the processing unit of the avionics computer, comprising determining, depending on a result of the comparing step, a terminal point that has an altitude equal to said threshold altitude and that forms, with a position of the missed approach point, a straight line segment that has a slope equal to a slope of a straight line segment defined by the missed approach point and the final approach fix, said terminal point being capable of being used as said anchor point; and executing, implemented by the processing unit of the avionics computer, an FLS approach calculated between at least the final approach fix altitude and the terminal point using the slope of the straight line segment to land the aircraft on the runway of the aerodrome.

2. The method as claimed in claim 1, wherein, if the comparing step concludes that the first altitude is greater than or equal to said threshold altitude, the computing step uses said terminal point as the anchor point.

3. The method as claimed in claim 1, wherein if the comparing step concludes that the first altitude is less than said threshold altitude, the computing step uses as the anchor point:

the prescribed final end point, in case of a presence of a prescribed final end point in the navigation database; or said terminal point, in case of an absence of the prescribed final end point from the navigation database.

4. The method as claimed in claim 1, wherein a projection on the ground of the terminal segment is parallel to or aligned with an axis of the runway.

5. The method as claimed in claim 1, wherein a projection on the ground of the terminal segment makes a non-zero angle less than or equal to 90° relative to an axis of the runway.

6. An avionics computer, being a flight management system, for determining an anchor point of a terminal segment of a virtual path for a non-precision Flight Management System (FMS) Landing System (FLS) approach mode of an aircraft, with a view to landing the aircraft on a runway of an aerodrome, said terminal segment starting at a final approach fix and ending at said anchor point, said avionics computer comprising at least a processing unit and a navigation database, wherein the processing unit is configured:

to compare a first altitude with a threshold altitude, the first altitude corresponding to an altitude of a missed approach point relative to the runway contained in the navigation database of the avionics computer, the threshold altitude being equal to a sum of a second altitude corresponding to the altitude of the runway and of a threshold crossing height;

to determine, depending on a comparison, a terminal point that has an altitude equal to said threshold altitude and that forms, with a position of the missed approach point, a straight line segment that has a slope equal to a slope of the straight line segment defined by the missed approach point and the final approach fix, said terminal point being capable of being used as said anchor point; and to execute an FLS approach calculated between at least the final approach fix altitude and the terminal point using the slope of the straight line segment to land the aircraft on the runway of the aerodrome.

7. A set of avionics systems for implementing a non-precision Flight Management System (FMS) Landing System (FLS) approach mode of an aircraft, with a view to landing the aircraft on a runway of an aerodrome, said set of avionics systems comprising at least a flight management system configured to use a virtual path comprising a terminal segment that is defined with respect to an anchor point, wherein the flight management system comprises at least one avionics computer for determining the anchor point, the at least one avionics computer for determining the anchor point for the FLS approach mode, said terminal segment starting at a final approach fix and ending at said anchor point, said at least one avionics computer comprising at least a processing unit and a navigation database, wherein the processing unit is configured:

to compare a first altitude with a threshold altitude, the first altitude corresponding to an altitude of a missed approach point relative to the runway contained in the navigation database of the avionics computer, the threshold altitude being equal to a sum of a second altitude corresponding to the altitude of the runway and of a threshold crossing height;

to determine, depending on a comparison, a terminal point that has an altitude equal to said threshold altitude and that forms, with a position of the missed approach point, a straight line segment that has a slope equal to a slope of the straight line segment defined by the missed approach point and the final approach fix, said terminal point being capable of being used as said anchor point; and to execute an FLS approach calculated between at least the final approach fix altitude and the terminal point using the slope of the straight line segment to land the aircraft on the runway of the aerodrome, and wherein the flight management system is configured to use the anchor point determined by said avionics computer as said anchor point of the terminal segment of the virtual path.

8. The set of avionics systems as claimed in claim 7, wherein the set of avionics systems is installed in an aircraft.

* * * * *